(12) United States Patent
Gonzalez Rechea et al.

(10) Patent No.: US 9,738,135 B2
(45) Date of Patent: Aug. 22, 2017

(54) FASTENING ARRANGEMENT

(71) Applicant: Mahle International GmbH, Stuttgart (DE)

(72) Inventors: Pedro Gonzalez Rechea, Stuttgart (DE); Eugen Pfeifer, Stuttgart (DE)

(73) Assignee: Mahle International GmbH, Stuttgart (DE)

( * ) Notice: Subject to any disclaimer, the term of this patent is extended or adjusted under 35 U.S.C. 154(b) by 0 days.

(21) Appl. No.: 15/135,508

(22) Filed: Apr. 21, 2016

(65) Prior Publication Data

US 2016/0311290 A1 Oct. 27, 2016

(30) Foreign Application Priority Data

Apr. 22, 2015 (DE) .................. 10 2015 207 371

(51) Int. Cl.
*A47G 29/18* (2006.01)
*B60H 1/00* (2006.01)
*F25B 9/00* (2006.01)
*F25B 43/00* (2006.01)
*F16B 9/02* (2006.01)

(52) U.S. Cl.
CPC ......... *B60H 1/00521* (2013.01); *F16B 9/026* (2013.01); *F25B 9/008* (2013.01); *F25B 43/006* (2013.01); *B60H 2001/006* (2013.01)

(58) Field of Classification Search
CPC .......... B60H 1/00521; B60H 2001/006; F25B 9/008; F25B 43/006; F16B 9/026
See application file for complete search history.

(56) References Cited

U.S. PATENT DOCUMENTS

| 2007/0102924 | A1 | 5/2007 | Niermeyer |
| 2009/0078840 | A1 | 3/2009 | Wolvin |
| 2014/0003973 | A1* | 1/2014 | Arai .................. F04D 29/4206 417/363 |

FOREIGN PATENT DOCUMENTS

| DE | 1473036 A1 | 10/1969 |
| DE | 29719733 U1 | 12/1997 |

(Continued)

OTHER PUBLICATIONS

European Search Report for Application No. 16165133.6 Dated Aug. 24, 2016.

(Continued)

*Primary Examiner* — Amy Sterling
(74) *Attorney, Agent, or Firm* — Fishman Stewart PLLC

(57) ABSTRACT

A motor vehicle may have a cylindrical component having two grooves aligned orthogonally to a cylinder axis, recessed into local areas of a lateral surface, and running parallel to each other, and a blind hole in an end of the cylindrical component. A fastening component for the cylindrical component may include a holding device having a U-shaped socket and a head portion having a through opening. The holding device may be matched to the cylindrical component in such a way that the cylindrical component is positively insertable via the two grooves into the U-shaped socket until the blind hole in the end is in alignment with the through opening in the head portion of the holding device. The fastening arrangement may also have a fastening element that is insertable and screwable through the through opening in the head portion into the blind hole in the cylindrical component.

12 Claims, 3 Drawing Sheets

(56) References Cited

FOREIGN PATENT DOCUMENTS

| | | |
|---|---|---|
| DE | 20005887 U1 | 8/2000 |
| DE | 10063812 A1 | 6/2002 |
| DE | 102007034028 A1 | 1/2009 |
| DE | 102013211961 A1 | 12/2014 |
| JP | H04 048023 | 4/1992 |

OTHER PUBLICATIONS

English abstract for DE10063812.
English abstract for DE-102013211961.
German Search Report for DE-102015207371.8, dated Jan. 27, 2016.

* cited by examiner

FASTENING ARRANGEMENT

CROSS-REFERENCE TO RELATED APPLICATIONS

This application claims priority to German Patent Application No. 10 2015 207 371.8, filed Apr. 22, 2015, the contents of which are hereby incorporated by reference in their entirety.

TECHNICAL FIELD

The present invention relates to a fastening arrangement for a cylindrical component, e.g. an accumulator in a mobile air-conditioning system, on a body of a motor vehicle. The invention furthermore relates to a holding device of a fastening arrangement of this kind and to a motor vehicle having a fastening arrangement of this kind.

BACKGROUND

Owing to higher technical requirements, especially in respect of pressure and temperature in circuits containing carbon dioxide ($CO_2$) as a refrigerant, the $CO_2$ components have a relatively high component weight in comparison to R134a components, for example. Owing to this higher weight and also the high thermal and pressure-related loads, components of this kind must, on the one hand, be held reliably but, on the other hand, also in a low-cost way in a motor vehicle.

DE 200 05 887 U1 discloses a fastening arrangement of the type in question in the form of a hoop-type holder for a refrigerant container in a vehicle air-conditioning system, in particular an accumulator, which has a bracket having fastening openings and has at least one hoop which can be tightened around the refrigerant container by means of a catch. Here, the hoop has a quick-locking catch with integrated positive engagement elements for tightening and holding. The intention is thereby to achieve holding of the refrigerant container in a manner which is simple in terms of assembly but also assures high operational reliability.

DE 297 19 733 U1 discloses a fastening arrangement having a holder for a dryer or accumulator container in a vehicle air-conditioning system, having an approximately ring-shaped clamp for the container and at least one holding lug connected integrally to the clamp and having at least one fastening opening. Here, the holder is designed as an integral injection moulded plastic component composed of a polymer reinforced with long fibres. The intention is thereby to allow low-cost and, at the same time, weight-optimized holding of the accumulator container.

However, the holding devices or fastening arrangements known from the prior art are generally relatively highly complex and, as a result, can be produced only with great effort and expense.

SUMMARY

The present invention is therefore concerned with the problem of specifying an improved or at least alternative embodiment of a fastening arrangement of the type in question which, in particular, is less expensive and furthermore allows reliable and secure holding of a component to be held.

According to the invention, this problem is solved by the subject matter of the independent claims. Advantageous embodiments form the subject matter of the dependent claims.

The present invention is based on the general concept of equipping a fastening arrangement for holding a cylindrical component, e.g. an accumulator of a mobile air-conditioning system, on a body of a motor vehicle with a fork-shaped socket into which the cylindrical component to be held can be inserted positively between two grooves formed in a manner complementary to the prongs of the fork. For final fixing there is a fastening element, although, as an alternative, simple wedging between the prongs of the fork is also possible. For this purpose, the cylindrical component has two grooves, which are aligned orthogonally to the cylinder axis, are recessed into local areas of a lateral surface and run parallel, and a blind hole in the end. The holding device, for its part, is the above-described fork-shaped or U-shaped socket and a head portion having a through opening. Here, the cylindrical component, e.g. the accumulator, and the holding device are matched to one another in such a way that the component can be inserted positively by means of its two grooves into the U-shaped socket until the blind hole in the end is in alignment with the through opening in the head portion of the holding device. Likewise provided is a fastening element which can be inserted or screwed through the through opening in the head portion into the blind hole in the component. It is thereby possible to create a holding device for holding an accumulator of this kind, which holding device is, on the one hand, inexpensive and, on the other hand, extremely reliable. Here, the holding device with the U-shaped socket and the head portion can be formed from metal, for example, in particular as a formed sheet metal part, or, alternatively, also as an injection moulding and therefore relatively easily.

In an advantageous development of the solution according to the invention, a surface of the head portion of the holding device, said surface facing the end of the component, extends obliquely to the end of the component and thus serves as a wedging surface as the component is inserted. In addition to retaining the component in the holding device by means of the fastening element, wedged retention is, of course, also conceivable, for which purpose the obliquely aligned head portion surface designed as a wedging surface can be used, for example. In addition or as an alternative, it is also possible to provide for the component to be gripped between the two U-legs of the U-shaped socket. By this means too, reliable and self-fixing retention of the component in the holding device can be provided.

In an advantageous development of the solution according to the invention, an internal contour of the U-shaped socket is of complementary design to an external contour of the component. It is thereby possible to ensure that the component rests in surface contact, by means of its external contour, on the internal contour of the U-shaped socket and is thereby held reliably in at least two directions.

In another advantageous embodiment of the solution according to the invention, the holding device has a first lug having a through opening. By means of this first lug, the holding device and, by means of the latter, also the component can be screwed to the body of the motor vehicle. It is conceivable, for example, that a threaded bolt welded to the body is provided, said bolt being inserted through the through opening in the first lug and secured by means of a nut. In order to be able to at least minimize vibration transmission between the motor vehicle and the component in this case, at least one vibration-damping decoupling element having an external annular groove can be provided, which passes through the first lug, and wherein an edge of the associated through opening engages in the annular groove and thereby fixes the decoupling element. Of course, a second lug and a third lug, each having a through opening, can be provided in a similar way, wherein the through opening in the second lug is aligned orthogonally to the through opening in the first lug, and the through opening in the third lug is aligned orthogonally to the through openings in the first and second lugs. Fixing of the holding device in all three spatial directions relative to the motor vehicle would thereby be possible.

It is expedient if at least two decoupling elements having different damping properties and/or sizes are provided. Different forces act in the motor vehicle on the component to be held by means of the fastening arrangement according to the invention, wherein, for example, the forces to be absorbed in the vertical direction by the holding device are greater than those in the horizontal direction. For this reason, decoupling elements that are appropriate to the requirements and correspond to the loads can be provided, for example, a larger decoupling element thus being provided to absorb vertical forces, for example.

In another advantageous embodiment of the solution according to the invention, a threaded bolt, which passes through the through opening in the respective decoupling element, is arranged on the body. In addition, a flanged sleeve, which matches the respective decoupling element and is arranged in the through opening in the decoupling element, between the threaded bolt and the decoupling element, in the assembled state, is provided. By means of a nut, which preloads the respective decoupling element against the body via the flanged sleeve in the state in which it has been screwed onto the threaded bolt, the component can be fixed relative to the body. Here, the flanged sleeve itself generally has an at least slightly shorter axial length than the associated decoupling element, as a result of which the flanged sleeve compresses the decoupling element and hence preloads it against the body as the nut is tightened on the bolt. In this arrangement, the flanged sleeve has a hollow-cylindrical shank, which is adjoined by the radial end flange. In the assembled state, the inner lateral surface of the hollow-cylindrical shank surrounds the threaded bolt, whereas its outer lateral surface is arranged in the through opening in the decoupling element. Here, the external radius of the shank of the flanged sleeve corresponds to the internal radius of the through opening in the decoupling element.

Further important features and advantages of the invention will become apparent from the dependent claims, from the drawings and from the associated description of the figures with reference to the drawings.

It is self-evident that the features mentioned above and those which will be explained below can be used not only in the respectively indicated combination but also in other combinations or in isolation without exceeding the scope of the present invention.

BRIEF DESCRIPTION OF THE DRAWINGS

Preferred illustrative embodiments of the invention are shown in the drawings and are explained in greater detail in the following description, wherein identical reference signs refer to identical or similar or functionally identical components.

Of the figures, which are in each case schematic.

DETAILED DESCRIPTION

Figure 1:
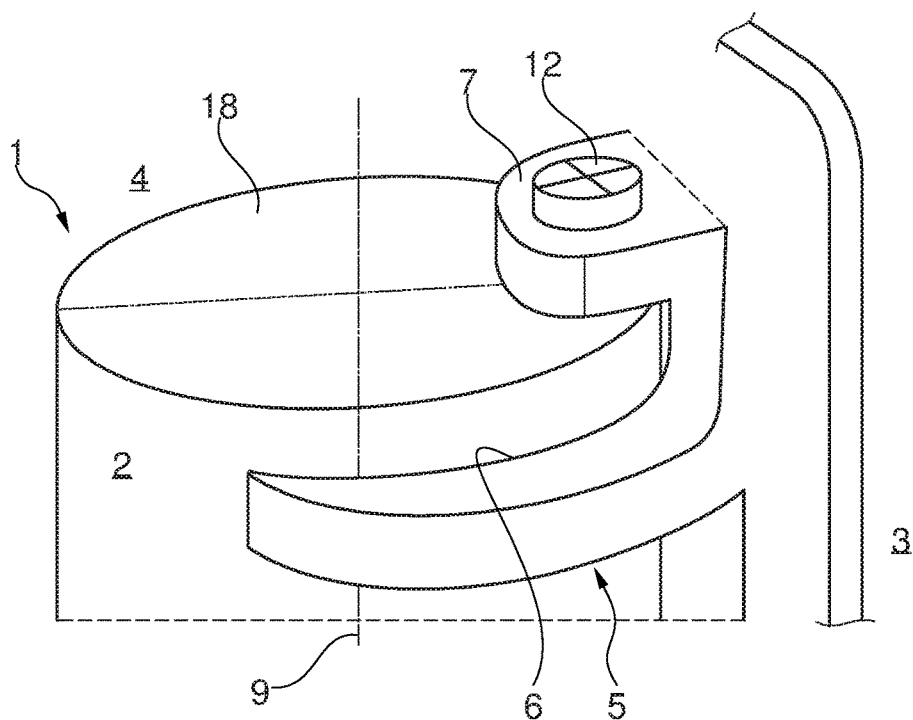
FIG. 1 shows a fastening arrangement according to the invention in one view.
Figure 2:
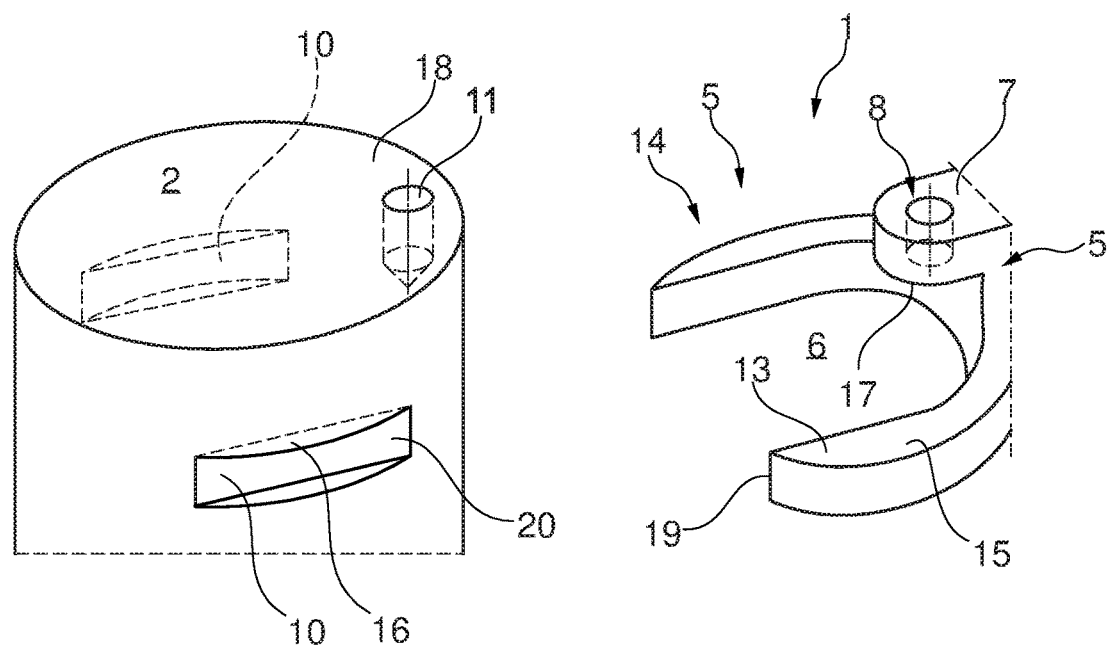
FIG. 2 shows an exploded view of the fastening arrangement according to the invention.

In accordance with FIGS. 1 and 2, a fastening arrangement 1 according to the invention for a cylindrical component 2, e.g. an accumulator of a mobile air-conditioning system, on a body 3 of a motor vehicle 4 has a holding device 5 having a U-shaped socket 6 and a head portion 7 having a through opening 8. The cylindrical component 2 has two grooves 10, which are aligned orthogonally to the cylinder axis 9, are recessed into local areas of a lateral surface thereof and run parallel, and a blind hole 11 in the end. According to the invention, the component 2 and the holding device 5 are matched to one another in such a way that the component 2 can be inserted positively by means of its two grooves 10 into the U-shaped socket 6 until the blind hole 11 in the end is in alignment with the through opening 8 in the head portion 7 of the holding device 5 and allows a fastening element 12 (cf. FIG. 1) to be inserted or screwed through the through opening 8 in the head portion 7 into the blind hole 11 in the component 2.

Here, the U-shaped socket 6 is formed by two U-legs 13 and 14 (cf. FIG. 2), wherein, with the component 2 inserted into the socket 6, contact between surfaces 15 and 16 and between surfaces 17 and 18 is conceivable in a first version, and simultaneous contact between surfaces 15 and 16, surfaces 17 and 18, and surfaces 19 and 20 is conceivable in a second version. Here, the geometry of the U-shaped socket 6 is preferably designed in such a way that the cylindrical component 2 can be held between the abovementioned surfaces 15 to 20 solely by means of the clamping force. The fastening element 12 can thus be used as the sole means of preventing loss.

It is also conceivable in this context that a surface 17 of the head portion 7 of the holding device, said surface facing the end 18 (surface 18), extends obliquely to the surface 18 (end) and is thus designed as a wedging surface. Here, the oblique surface 17 leads to wedging if the component 2 is inserted into the U-shaped socket 6.

If FIG. 2 is considered, it can be seen that an internal contour of the U-shaped socket 6 is of complementary design to an external contour of the component 2, thereby ensuring surface contact between the component 2 and the socket 6.

Figure 3:
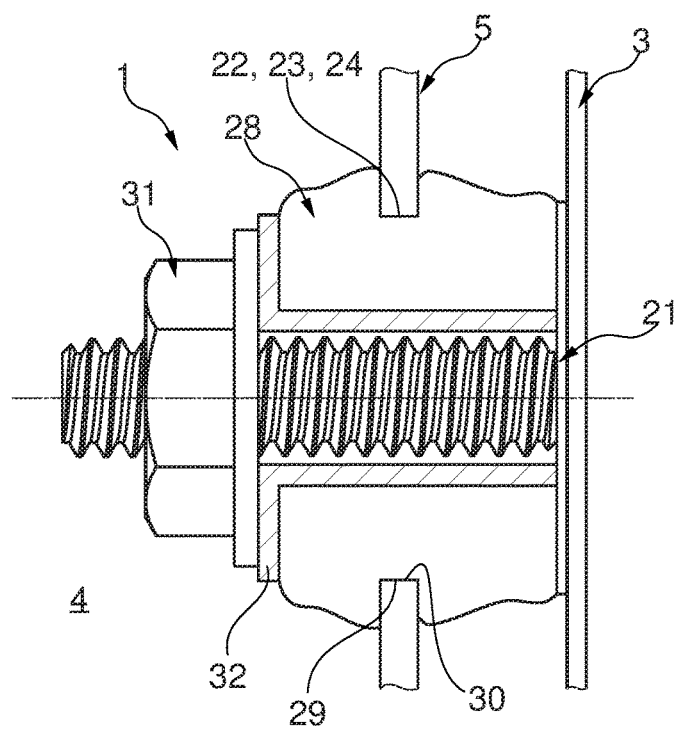
FIG. 3 shows a section through an arrangement in which a holding device belonging to the fastening arrangement is screwed to a body of a motor vehicle.
Figure 4:
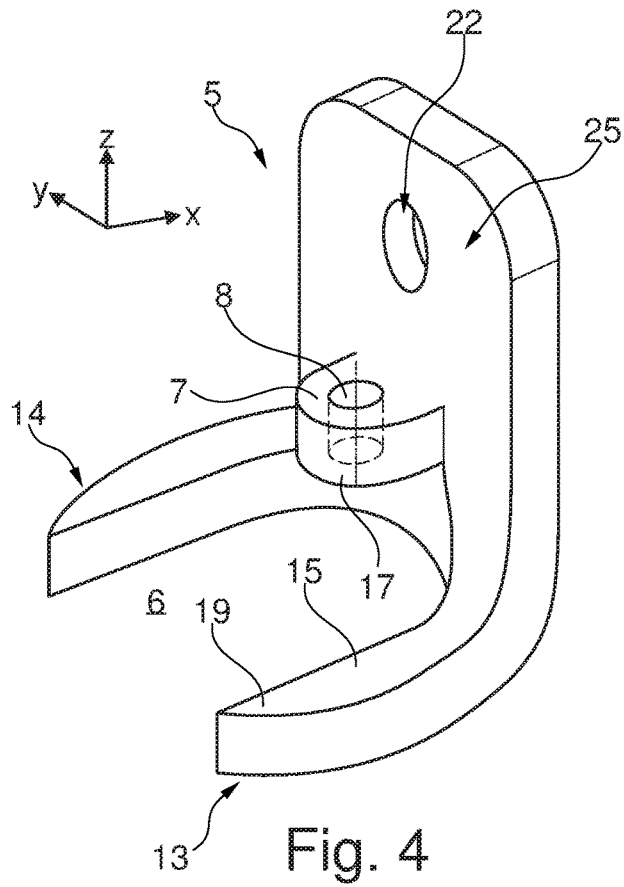
FIG. 4 shows a first possible embodiment of a holding device having a first lug.
Figure 5:
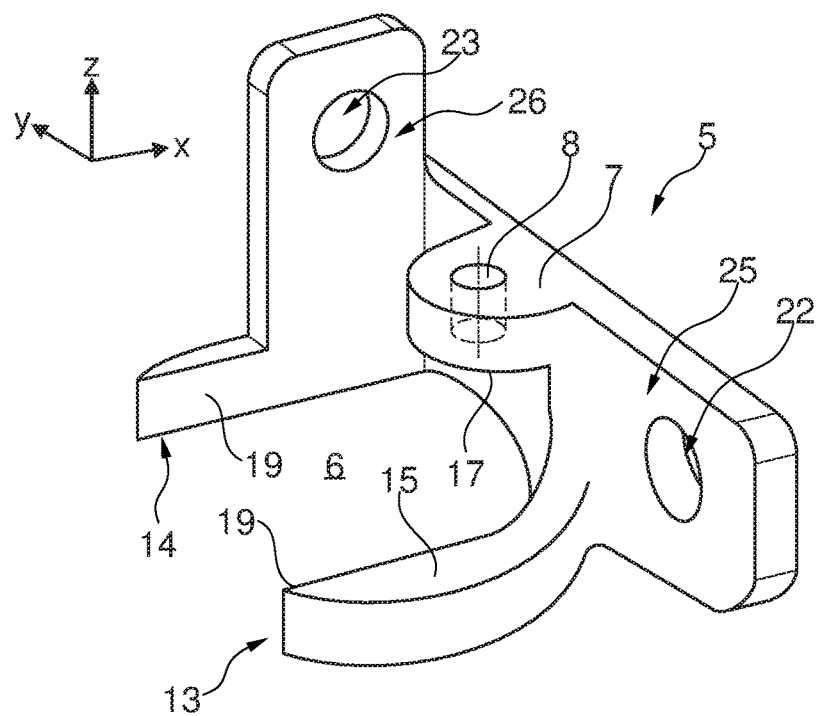
FIG. 5 shows an illustration similar to that in FIG. 4, but with the addition of a second lug.
Figure 6:
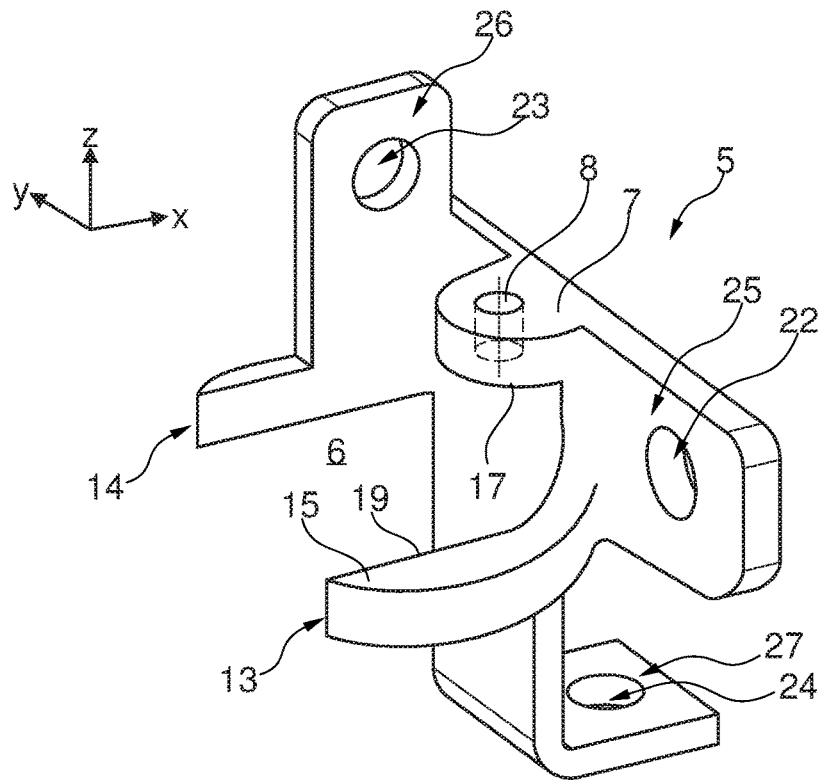
FIG. 6 shows an illustration similar to that in FIG. 5, but with the addition of a third lug.

Here, the holding device 5 is fastened on the body 3 of the motor vehicle 4 by means of a threaded bolt 21 arranged on the body 3, for example (cf. FIG. 3). In this arrangement, said threaded bolt 21 is inserted through a through opening 22, 23 or 24 in the holding device 5. Here, through opening 22 is arranged in the region of a first lug 25 of the holding device 5, wherein through opening 23 is arranged in the region of a second lug 26 (cf. FIG. 5). If FIG. 6 is considered, the holding device 5 depicted there has a third lug 27 having through opening 24, wherein said through opening 24 is also orthogonal to through openings 22 and 23. In this arrangement, the third lug 27 is also aligned orthogonally to the first lug 25 and orthogonally to the second lug 26. The second lug 26 is aligned orthogonally to the first lug 25.

For vibrational decoupling of the holding device 5 from the body 3 of the motor vehicle 4, a vibration-damping decoupling element 28 (cf FIG. 3) having an external annular groove 29 can be provided, which passes through an associated lug 25, 26, 27, and wherein an edge 30 of the associated through opening 22, 23, 24 engages in the annular groove 29. For fastening, a nut 31 is provided, which preloads the respective decoupling element 28 against the body 3 via a flanged sleeve 32 in the state in which it has been screwed onto the threaded bolt 21. Here, the flanged sleeve 32 is designed to match the decoupling element 28 and the threaded bolt 21. In this arrangement, the nut 31 rests on the end flange of the flange sleeve 32.

Since different forces are to be absorbed in the vertical direction (Z direction) and the horizontal direction (X direction and Y direction) during operation, it is also possible for at least two decoupling elements 28 having different damping properties and/or sizes to be provided.

By means of the holding device 5 according to the invention, it is, on the one hand, possible to achieve reliable and secure fixing of the component 2, and this is furthermore inexpensive.

The invention claimed is:

1. A fastening arrangement for a cylindrical component on a body of a motor vehicle, the cylindrical component having two grooves aligned orthogonally to a cylinder axis, recessed into local areas of a lateral surface, and running parallel to each other, and a blind hole in an end of the cylindrical component, the fastening arrangement comprising:
   a holding device having a U-shaped socket and a head portion having a through opening,
   the holding device being matched to the cylindrical component in such a way that the cylindrical component is positively insertable via the two grooves into the U-shaped socket until the blind hole in the end is in alignment with the through opening in the head portion of the holding device, and
   a fastening element that is at least one of insertable and screwable through the through opening in the head portion into the blind hole in the cylindrical component.

2. A fastening arrangement according to claim 1, wherein the head portion of the holding device includes a wedging surface facing the end of the cylindrical component and extending obliquely to the end.

3. A fastening arrangement according to claim 1, wherein the U-shaped socket includes two U-legs between which the cylindrical component is grippable.

4. A fastening arrangement according to claim 1, wherein the U-shaped socket includes an internal contour by which the U-shaped socket rests in surface contact on an external contour of the cylindrical component or of the grooves.

5. A fastening arrangement according to claim 1, wherein the holding device has a first lug having a through opening.

6. A fastening arrangement according to claim 5, wherein the holding device has a second lug having a through opening, which is aligned orthogonally to the through opening in the first lug.

7. A fastening arrangement according to claim 6, wherein the holding device has a third lug having a through opening, which is aligned orthogonally to the through openings in the first and second lugs.

8. A fastening arrangement according claim 5, further comprising at least one vibration-damping decoupling element having an external annular groove, which passes through the first lug, and wherein an edge of the through opening engages in the annular groove.

9. A fastening arrangement according to claim 8, further comprising at least two decoupling elements having at least one of different damping properties and different sizes.

10. A fastening arrangement according claim 8, further comprising:
    a threaded bolt, which passes through the through opening in the at least one decoupling element,
    a flanged sleeve between the threaded bolt and the at least one decoupling element in an assembled state, the flanged sleeve matching the at least one decoupling element and being arranged in the through opening in the at least one decoupling element, and
    a nut, which preloads the at least one decoupling element against the body via the flanged sleeve in a state in which the nut has been screwed onto the threaded bolt.

11. A fastening arrangement according to claim 10, wherein the nut rests on an end flange of the flanged sleeve.

12. A holding device of a fastening arrangement, comprising a U-shaped socket and a head portion having a through opening,
    wherein the U-shaped socket is configured to receive a cylindrical component via at least two grooves in the cylindrical portion until the through opening is in alignment with a blind hole in an end of the cylindrical component, the two grooves being aligned orthogonally to a cylinder axis, recessed into local areas of a lateral surface of the cylindrical component, and running parallel to each other, and
    wherein the through opening is configured to receive a fastening element to fasten the cylindrical component and the holding device when the through opening and the blind hole are aligned.

* * * * *